INVENTOR.
WILLIAM A. RHODES
BY
Wm. H. Dean

INVENTOR.
WILLIAM A. RHODES
BY
*Wm. H. Dean*

United States Patent Office 3,450,852
Patented June 17, 1969

3,450,852
FILAMENT ACTUATED ALARM DEVICE
William A. Rhodes, 4421 N. 13th Place,
Phoenix, Ariz. 85014
Filed Sept. 29, 1966, Ser. No. 582,965
Int. Cl. H01h *3/14, 17/10;* G08b *13/12*
U.S. Cl. 200—61.93
8 Claims

ABSTRACT OF THE DISCLOSURE

This is an alarm device using the force of gravity and a thread line to detect intrusion of burglars or fire when its thread is tighthened, cut, burned or released to provide an audible or silent alarm from a source of electricity.

---

This invention relates to an alarm device, and more particularly, to an alarm device comprising a novel thread operated switch means, which may be operated by linear deflection of a thread either by tension or release of tension therein.

Various alarm devices have been known in the prior art and particularly those adapted for use as burglar alarms. Most of these are very complicated devices and generally require custom installation in various areas, such as dwellings, shops, warehouses or other areas. The custom installation of such burglar alarms renders them somewhat inflexible and requires careful installation in accordance with the various physical features of each individual location.

Many of the conventional burglar alarms employ complicated electronic equipment, which must be maintained and carefully checked from time to time. Additionally, such equipment installed in a fixed disposition, may not readily be moved around to accommodate other areas, particularly those surrounding a certain establishment or building, and further, the equipment itself being wired to buildings or other physical structures may not be transported elsewhere and readily used in some other location.

Accordingly, it is an object of the present invention to provide a very simple and efficient alarm device, which is readily portable, which may be set up in various areas, such as those in a home, or surrounding a home, such that a great number of installations and uses of the invention may be made alternately, as desired.

Another object of the invention is to provide an alarm device, which is completely portable.

Another object of the invention is to provide an alarm device which is passive at all times, except when it operates to energize an alarm device thereof, whereby electrical energy is used by the device only during the sounding of an alarm.

Another object of the invention is to provide a novel alarm device utilizing a fine thread, which may either be placed under tension or released to actuate the alarm device of the invention.

Another object of the invention is to provide an alarm device having a novel combination of a pivoted arm and thread, such that the thread may be anchored to support the pivoted arm in a pivoted position, wherein the arm tends to respond to gravity to move to another position and may be normally moved upward by tension in the thread and wherein switch means may be actuated by the arm, when it is moved upwardly by tension in the thread, or when it falls as a result of relaxation of the thread so as to actuate the switch in either position of the arm as it responds to gravity or when it is pulled upwardly by the thread.

Another object of the invention is to provide a novel alarm device utilizing a thread actuated pivoted arm and wherein a novel rewind reel mechanism is provided for rewinding a large amount of the thread for convenience in retracting the thread from one alarm location to permit subsequent installation thereof in another location.

Another object of the invention is to provide a novel alarm device having a pivoted switch actuating arm which actuates a switch when the arm responds to gravity and pivots downwardly and when the arm is pulled upwardly by tension of a thread and wherein latch means is provided for holding the arm in either an upper position, when pulled upward by the thread or in a downward position, when the arm drops as a result of release of the thread, such that the latch means holding the arm in either the upper or downward position maintains a position of the arm in which it holds a switch closed and maintains continuous energization of an alarm device of the invention.

Further objects of the invention is to provide an alarm device having great versatility of installation and use.

Another object of the invention is to provide an alarm device, which is very economical and may be purchased by various persons for domestic uses, especially those persons who could not afford expensive and complicated alarm devices.

Further objects and advantages of the invention may be apparent from the following specification, appended claims and accompanying drawings, in which:

Figure 1:
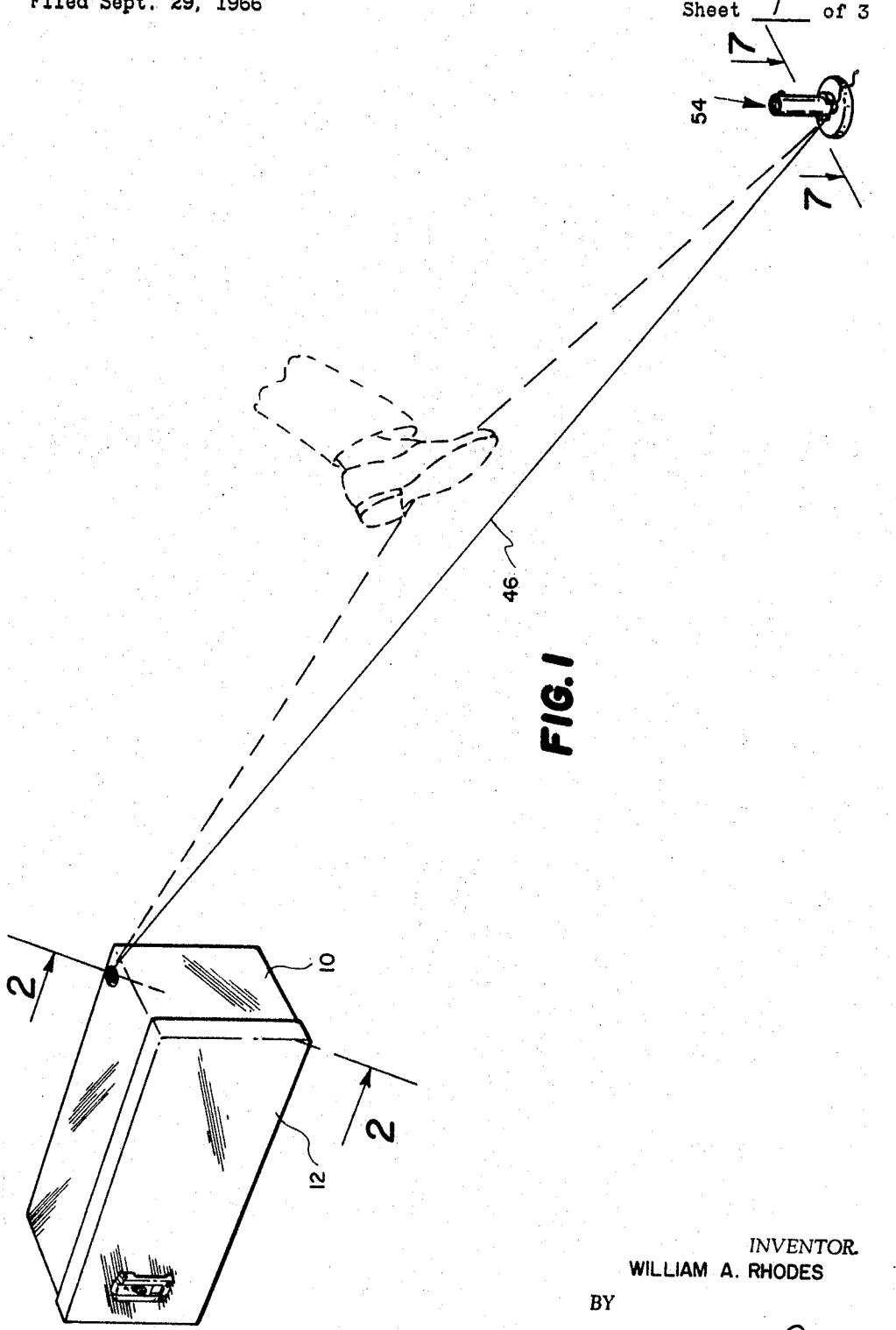
FIG. 1 is a perspective view of an alarm device in accordance with the present invention, and showing by broken lines the foot of a human engaging a thread of the alarm device and actuating it.
Figure 2:
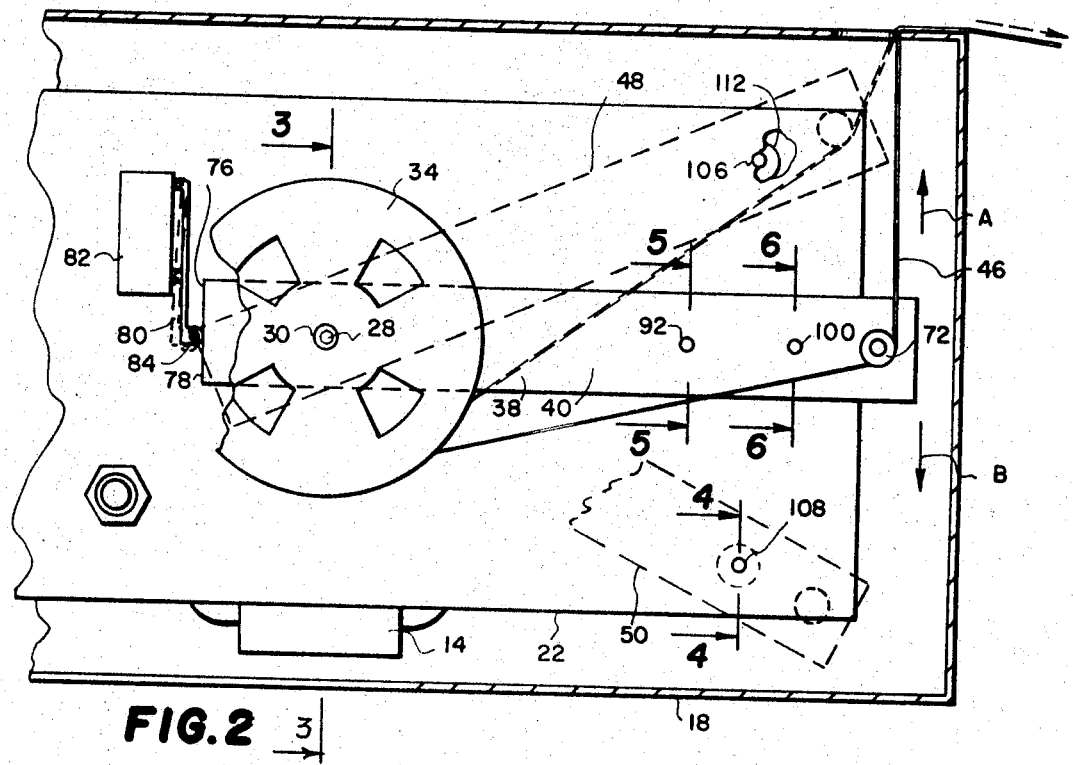
FIG. 2 is an enlarger fragmentary sectional view taken from a line 2—2 of FIG. 1.
Figures 3, 4, 5:
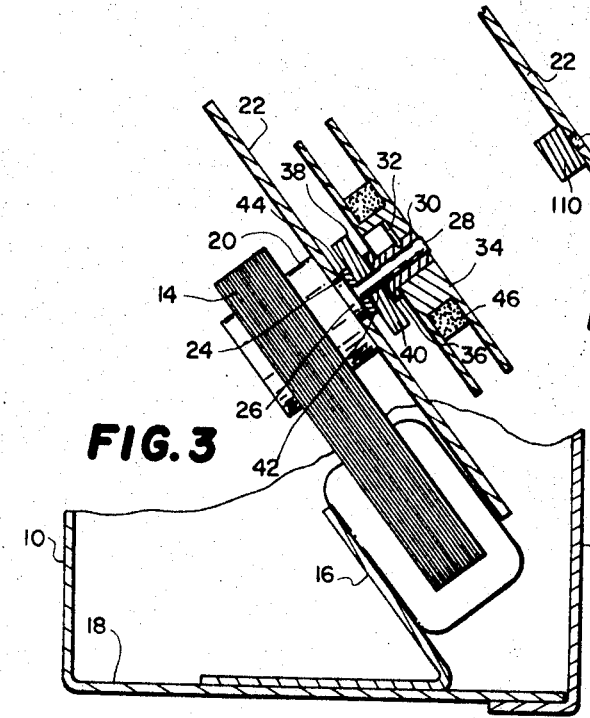
FIG. 3 is a fragmentary sectional view taken from the line 3—3 of FIG. 2.
FIG. 4 is a fragmentary sectional view taken from the line 4—4 of FIG. 2.
FIG. 5 is a fragmentary sectional view taken from the line 5—5 of FIG. 2.

As shown in FIGS. 1, 2 and 3 the alarm device of the invention is provided with a box-shaped housing 10 having a removable or hinged cover 12.

Mounted in the box 10 is a motor 14 carried by a bracket 16 secured to the bottom 18 of the housing 10.

Supported on a frame portion 20 of the motor 14 is a plate 22. This plate 22 is provided with an opening 24 surrounding a shaft bearing hub of the motor. Projecting from the shaft bearing hub 26 is the shaft 28 of the motor. This shaft 28 being rotatably driven by the motor, and mounted on the shaft 28 is a reel holding bushing 30 having a radially projecting pin 32 adapted to engage the conventional slot in the conventional structure of a reel 34, which is similar to a conventional 8 mm. movie film reel structure.

The bushing 30 is provided with a shoulder 36 bearing on an outer side 38 of an arm 40. This arm 40 is provided with an opening 42 therein through which the motor shaft 28 projects.

A washer 44 is disposed between the arm 40 and the plate 22.

Wound on the reel 34 is thread 46. This thread 46 is preferably dull finish black cotton similar to sewing thread. In actual practice, conventional black sewing thread may be used on the reel 34 and as a part of the alarm device of this present invention.

The arm 40 being pivoted on the shaft 28 is free to move upwardly in a direction of an arrow A or downwardly in a direction of an arrow B, as shown in FIG. 2 of the drawings, and which movement will be hereinafter described in detail. Thus, the arm 40 may pivot about the axis of the motor shaft 28 to an uppermost position, as indicated by broken lines 48 and downwardly to a lowermost position, as indicated by broken lines 50.

The thread 46 wound onto the reel 34 is held by the reel 34 and the motor shaft 28 against rotation due to inertia of the rotor of the motor 14.

Figure 7:
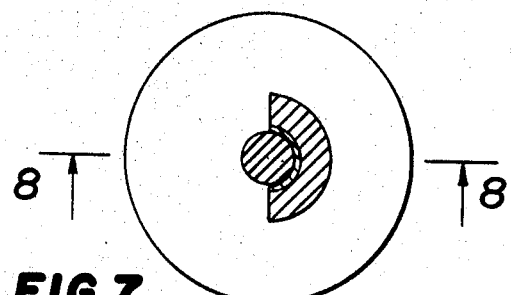
FIG. 7 is an enlarged plan sectional view of a thread anchor means of the invention taken from the line 7—7 of FIG. 1.
Figure 8:
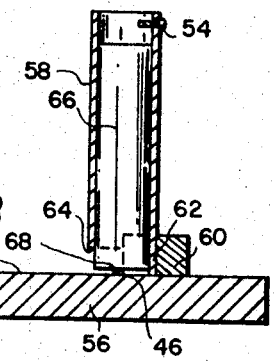
FIG. 8 is a sectional view taken from the line 8—8 of FIG. 7.

As shown in FIG. 1, the thread 46 may be extended a considerable distance from the housing 10 and held by an anchor designated 54. This anchor 54, as shown in FIGS. 7 and 8 of the drawings, comprises a base 56 having an upstanding tube 58 secured to a block 60 on the base 56. The tube 58 having an end portion 62 adjacent the base 56 secured to the block 60 and having a cutaway portion 64 directed in the opposite direction. Reciprocally mounted in the tube 58 and responsive to gravity is a weight or plunger 66 provided with a lower end 68 adapted to bear upon the thread 46, when placed on the topside 70 of the base 56. Thus, the thread 46 is held frictionally under the lower end of the weight or plunger 66, and may be either pulled therefrom or tension in the thread 46 may cause linear deflection thereof and may raise the arm 40, by means of a fixture 72, to the broken line position 48. Should the thread be pulled from the anchor 54 and to a slack or released condition, the arm 40 in response to gravity, may drop to the broken line position 50, all as will be hereinafter described in detail.

Figure 9:
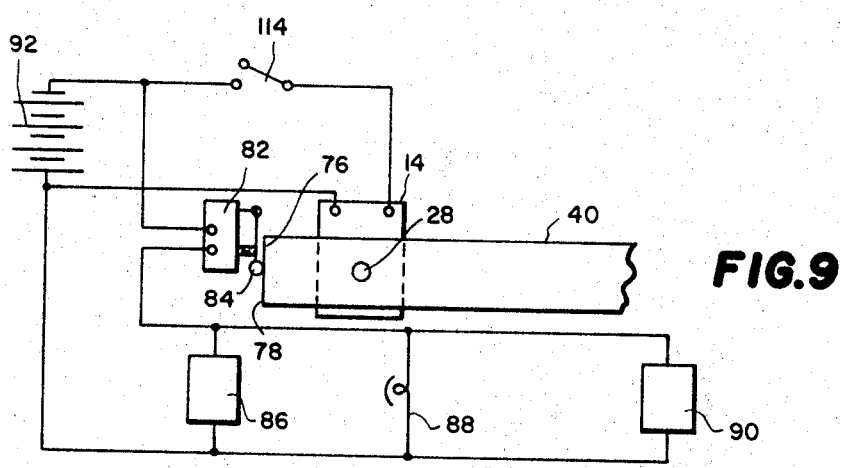
FIG. 9 is a diagrammatic view of the electrical apparatus and wiring of the alarm device of the invention.

The arm 40 at one end is provided with a pair of corner portions 76 and 78, which are alternately disposed to deflect an arm 80 of a microswitch or other suitable switch 82. The arm 80 being provided with a roller 84 engaging the end portions 76 and 78, when the arm 40 is either raised to the broken line position 48 or dropped to the broken line position 50. Thus, in either of the broken line positions, the switch 82 will be actuated to close a circuit, as shown in FIG. 9, said circuit comprising an audio amplifier 86, a flood lamp 88 and an audio warning system, such as a horn or bell 90. These devices all being in circuit with a battery 92 or an alternating current supply, as desired.

As shown in FIG. 5 of the drawings, the arm 40 is provided with an opening 92 therein, in which a pin 94 is removably disposed. This pin 94 is adapted to engage an opening 96 in the plate 22, said opening 96 backed up by a stop plate 98 so that the pin 94 is held in the opening 96 to locate the arm 40 in an intermediate position between the broken line positions 48 and 50. Thus, a neutral position of the arm is adapted to permit the switch 82 to be in an open position and in such position, will not pass any current to the elements 86, 88 and 90, hereinbefore described in connection with FIG. 9 of the drawings. The pin 94, however, is normally removed and placed in an opening 100 in the arm 40, when it is desired to set the alarm for actuation. When the pin 94 is removed from the opening 96, the arm 40 is free to be moved by the cord or thread 46 or to be released thereby, as hereinbefore described.

Figure 6:
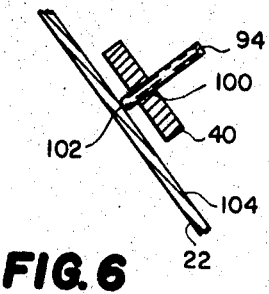
FIG. 6 is a fragmentary sectional view taken from the line 6—6 of FIG. 2.

When the pin 94 is placed in the opening 100, as shown in FIG. 6, a spheroid or smooth end portion 102 of the pin 94 rides an outer surface 104 of the plate 22 and the pin portion 102 follows an arcuate path in FIG. 2 to an opening 106 in the plate 22, said opening 106 corresponding with the broken line position 48 of the arm, while another opening 108 in the plate 22 is disposed in the arcuate path of the opening 100, and this opening 108 is adapted to receive the end 102 of the pin 94.

Inasmuch as the openings 106 and 108 are similar, attention is directed to FIG. 4, wherein the opening 108 is disclosed. Behind this opening 108 is a permanent magnet 110 adapted to attract the pin 94, which is made of steel or other magnetically responsive material. Likewise, the pin opening 106 is disposed, such that a magnet 112 therebehind will permit the magnet to draw the pin into said opening 106 and, thus, these openings 106 and 108 and the respective magnets 112 and 110 form latch means for holding the arm in either an uppermost position of travel, namely, in the broken line position 48 or the lowermost position of travel, namely, in the broken line position 50.

In operation, the thread 46 may either be deflected laterally and linearly into the broken line position, as shown in FIG. 1, to cause the arm 40 to move up to the broken line position 48, which closes the switch 82 and activates the elements 86, 88 and 90 or in the event the thread 46 is broken or removed from the anchor 54, the arm 40 may respond to gravity and pivot downwardly around the axis of the shaft 28 into the broken line position 50 and in either of these broken line positions 48 or 50, the switch 82 will be operated to energize the elements 86, 88 and 90, hereinbefore described.

When it is desired to retract the thread 46, as shown in FIG. 1 of the drawings, a switch 114, as shown in FIG. 9, is closed which operates the motor 14 to rotate its shaft 28 and the reel 34 to wind the thread 46 onto the reel 34. When it is desired to reset the alarm, the pin 94 is positioned in the opening 92, as hereinbefore described, and in the opening 96 of the plate 22 and the thread 46 is set, as shown in FIG. 1, to hold the arm 40 in substantially the intermediate or solid line position, shown in FIG. 2. The pin 94 is then placed in the opening 100 to operate in a latched position, either in the broken line position 48 of the arm 40 or in the broken line position 50 thereof, and in this position, latching is provided by the pin 94, and either of the respective openings 106 and 108 may cause continuous holding of the switch 82 in operation. The alarm may thus be actuated and operate continuously until reset.

With reference to FIG. 3 of the drawings, it will be seen that the plate 22 is inclined to the vertical and that the shaft 28 is inclined to the horizontal, such that the pin 94 will operate on a gravitational basis into the openings 106 and 108 and also such that the angular plane on which the arm 40 travels tends to minimize the loading on the thread 46.

Figure 10:
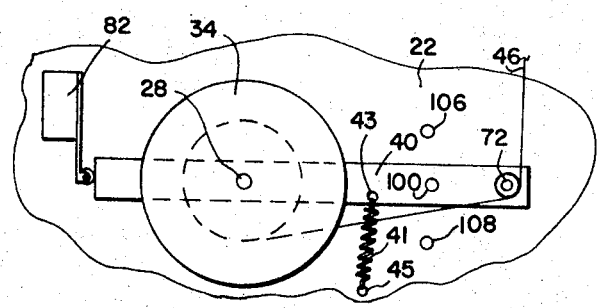
FIG. 10 is a fragmentary top or plan view of the modification of the present invention.

As shown in FIG. 10, the arm 40 may be pivoted on the axis of the shaft 28, and this shaft 28 may be in a vertical position, such that the arm 40 pivots about a vertical axis and is therefore not responsive to gravity.

A spring 41 is connected to a pin 43 carried by the arm 40 and the opposite end of the spring 41 is connected to a pin 45 on the plate 22.

The spring 41 thus serves to pivot the arm 40 in a direction of the arrow B, as previously described in connection with FIG. 2 of the drawings, while the thread 46, under tension, tends to pivot the arm 40 in the direction of the arrow A.

The spring 41 is utilized to substitute for gravity, when the axis of the shaft 28 is disposed vertically.

The other features of the invention are substantially as hereinbefore described.

It will be appreciated by those skilled in the art that various modifications of the present invention may be resorted to in a manner limited only by a just interpretation of the following claims.

I claim:

1. In an alarm device combination of: a frame; an arm pivoted on said frame and having one end tending to pivot downwardly in response to gravity; means for connecting a thread to said one end for supporting said one end in an intermediate position between the uppermost and lowermost limits of its pivotal travel; switch means operable by said arm when it is pivoted upwardly by tension in said thread; said switch means also being operable by said arm, when tension of said thread is released and when said arm pivots downwardly in response to gravity; and electrically operable means adapted and disposed to be energized through said switch means.

2. The invention, as defined in claim 1, wherein: pivot means is provided for pivotally mounting said arm on said frame, said pivot means having an axis disposed on an incline relative to the horizontal.

3. The invention, as defined in claim 1, wherein: said thread is wound on a reel; and a motor adapted to rotate said reel and wind said thread thereon.

4. The invention, as defined in claim 3, wherein: said motor is provided with a shaft forming a pivotal mounting for said arm and said reel is mounted on said motor shaft adjacent said arm.

5. The invention, as defined in claim 2, wherein: said pivot means comprises a motor shaft extending through said arm; a reel mounted on said motor shaft and driven thereby, said thread wound on said reel.

6. The invention, as defined in claim 1, wherein: said thread is held remotely from said arm by a gravity anchor means, said gravity means having means frictionally engageable with said thread for holding said arm supported in said intermediate position; said friction means comprising a base; a weight resting thereon; and means for permitting said weight to move upwardly relative to said base, whereby said thread may be clamped by said weight by gravity against said base, and whereby lateral force applied to said thread between said arm and said anchor means may either create sufficient tension in said thread to move said arm upwardly to actuate said switch means or said thread may be pulled from its position beneath said weight to allow said arm to drop downwardly to its lowermost position and to actuate said switch means.

7. The invention as defined in claim 2, wherein: a latch pin is freely slidably movable laterally relative to said arm and carried thereby; a plate adjacent to which said arm is pivotally mounted and against which said latch pin may move slidably; said plate having openings therein in the arcuate path of movement of said latch pin as carried by said arm; and magnetic means adjacent said openings to attract said latch pin for pulling said latch pin into said openings and locking said arm in either said uppermost or lowermost travel positions to hold said arm in such position to cause continuous operation of said switch, and to thereby cause continuous energization of said electrically operable means.

8. The invention, as defined in claim 1, wherein: latch means is provided and carried by said frame and disposed to engage and hold said arm in either an uppermost or lowermost pivoted position, when said arm is moved upward by said thread or allowed to drop downwardly in response to gravity to said lowermost position.

References Cited

UNITED STATES PATENTS

| | | | |
|---|---|---|---|
| 1,099,777 | 6/1914 | Sundel | 340—276 |
| 2,780,689 | 2/1957 | La Cavera | 200—61.93 |
| 3,343,008 | 9/1967 | Bancroft | 200—61.18 XR |

ROBERT K. SCHAEFER, *Primary Examiner.*

M. GINSBURG, *Assistant Examiner.*

U.S. Cl. X.R.

340—276